United States Patent Office 3,093,681
Patented June 11, 1963

3,093,681
3-HEXEN-1-YL-3-HEXENOATE
Garry G. Eichmann, Fair Lawn, and Walter Kimel, Highland Park, N.J., assignors to Hoffmann-La Roche Inc., Nutley, N.J., a corporation of New Jersey
No Drawing. Filed Mar. 22, 1962, Ser. No. 181,819
1 Claim. (Cl. 260—486)

This invention relates, in general, to a novel ester and to a method for producing same. More particularly, the invention relates to 3-hexen-1-yl-3-hexenoate and to a process for its production.

3-hexen-1-yl-3-hexenoate, a compound having the formula:

is a hitherto unknown derivative of 3-hexen-1-ol. It has an intense and lasting green leaf-like odor and, for this reason, it is extremely useful as an odor-imparting constituent of perfumes and similar compositions. The novel 3-hexen-1-yl-3-hexenoate can be used as such, or in admixture with other odorants, such as esters, aldehydes, etc., in the preparation of perfumes or in the preparation of other scented compositions. The manner in which the compound is used for such purposes will be readily apparent to those skilled in the art.

Thus, in its most comprehensive embodiment, the present invention is concerned with 3-hexen-1-yl-3-hexenoate as a new compound. In a more specific embodiment, this invention is concerned with a method of producing 3-hexen-1-yl-3-hexenoate.

In the practice of this invention, a mixture of 3-hexen-1-ol, water, an organic solvent and acetic acid is first prepared. This can be accomplished, for example, as follows: 3-hexen-1-ol is added to a mixture comprising water and an inert, water-immiscible organic solvent. Generally, a mixture of from about 7 to about 20 parts by weight, preferably about 10 parts by weight, of water, and from about 1 to about 3 parts by weight, preferably about 2.0 parts by weight, of organic solvent, will be provided for each part by weight of 3-hexen-1-ol to be added thereto. In preparing this mixture, one may use any inert, water-immiscible organic solvent in which the end product, namely, 3-hexen-1-yl-3-hexenoate, is soluble. Preferably, a solvent which is non-polar in nature is used, as, for example, benzene, toluene, xylene, etc. In the preferred embodiment of the invention, however, benzene is the solvent used.

Acetic acid is then added to the mixture thus produced. Generally, from about 0.6 to about 1.0 part by weight, preferably from about 0.7 to 0.8 part by weight, of acetic acid is incorporated into the mixture for each part by weight of 3-hexen-1-ol present therein.

The foregoing is a description of the method preferably employed to obtain the mixture which is used in the initial stage of the present process. It should be understood, however, that the sequence in which the named ingredients are used in formulating the mixture is not at all critical and that the manner in which the mixture is prepared has no effect whatsoever on the operability of the invention. Hence, rather than proceeding by the preferred method, as disclosed heretofore, one could first prepare a mixture of water, organic solvent and acetic acid and subsequently add 3-hexen-1-ol thereto. In the alternative, one could add 3-hexen-1-ol to the organic solvent and, thereafter, mix same with a mixture of water and acetic acid.

When the mixture which is described in the preceding paragraphs has been obtained, the desired 3-hexen-1-yl-3-hexenoate can be prepared by either of two methods. In the first such method, an aqueous solution of chromium trioxide is added slowly to the mixture and stirred therewith. From about 1.3 to about 2.0 parts by weight of chromium trioxide are incorporated into the mixture for each part by weight of 3-hexen-1-ol present therein. An exothermic reaction takes place and it proceeds to completion without external heating. The reaction mixture should be cooled, during the course of the reaction, to maintain the temperature thereof within the range of from about 20° C. to 50° C. Preferably, the reaction temperature should be maintained within the range of from about 30° C. to 35° C. The manner in which 3-hexen-1-yl-3-hexenoate is separated from the reaction mixture will be described hereinafter.

In the preferred embodiment of the invention, 3-hexen-1-yl-3-hexenoate is produced in a manner which is somewhat different than the alternate procedure described in the immediately preceding paragraph. In the preferred method, a dichromate salt, rather than chromium trioxide, is added to the previously prepared mixture of 3-hexen-1-ol, water, organic solvent and acetic acid. An aqueous solution of a mineral acid is thereafter added to the dichromate salt-containing mixture. Addition of the mineral acid results in the formation, in situ, of chromium trioxide by hydrolysis of the dichromate salt. Simultaneously with the generation of chromium trioxide, the reaction leading to the formation of 3-hexen-1-yl-3-hexenoate is initiated. The reaction commences spontaneously and is proceeds to completion exothermically with the evolution of heat. During the reaction, the mixture is continuously cooled to maintain the temperature thereof within the range of from about 20° C. to 50° C. Preferably, however, the mixture is maintained, by cooling, at a temperature within the range of from about 30° C. to 35° C. Throughout the reaction, the reaction mixture is stirred. The reaction time will vary depending, for example, upon the reaction temperature, the rate at which the aqueous mineral acid is introduced into the system, etc. Generally, however, when the reaction is allowed to proceed at a temperature of from about 30° C. to 35° C. and where the aqueous acid solution is added to the reaction system slowly, for example, over a period of about ninety minutes, the reaction will reach a point of substantial completion within five to eight hours after all of the mineral acid has been added. Completion of the reaction will be evidenced by the tendency of the reaction mixture to remain at room temperature without external cooling.

In general, any dichromate salt and any mineral acid which, in an aqueous medium, react to form chromium trioxide can be used in producing 3-hexen-1-yl-3-hexenoate by the preferred method of the invention. While alkali metal dichromates, as, for example, potassium dichromate, have been found to be suitable for use, sodium dichromate dihydrate is preferably employed. Moreover, while mineral acids, such as hydrochloric acid, phosphoric acid, nitric acid, etc., can be used, sulfuric acid is used in the preferred procedure.

The quantity of dichromate salt and mineral acid used in this embodiment of the invention can be varied. As a rule, a sufficient amount of dichromate salt and acid should be present in the system to provide from about 1.3 to about 2.0 parts by weight of chromium trioxide for each part by weight of 3-hexen-1-ol therein. Under ordinary circumstances this will be accomplished by incorporating from about 2.0 to about 3.0 parts by weight of the dichromate salt and at least about 2.0 parts by weight of acid into the starting mixture for each part of 3-hexen-1-ol present therein. The mineral acid will be introduced into the system generally in the form of an aqueous solution. While mineral acid solutions of varying concentrations can be used, it is preferred to employ an aqueous solution containing from about 25% to 40% of concentrated acid.

When, using either the preferred or alternate method, the reaction has proceeded to completion, the aqueous layer is first separated from the organic solvent layer, and subsequently extracted one or more times with an organic solvent. In general, any inert, organic solvent in which 3-hexen-1-yl-3-hexenoate is soluble can be used in carrying out this extraction. It is preferred, however, to use the same organic solvent in the extraction stage as was used originally in formulating the starting mixture. Thus, for example, where benzene was employed in the formulation of the starting mixture, the aqueous phase, which is separated from the organic solvent phase at this stage of the process, is extracted preferably with benzene. The organic solvent extracts, thus obtained, are added to the separated organic solvent phase of the reaction mixture and the combined solvent solution is washed first with sodium bicarbonate and then with an aqueous sodium chloride solution. The solvent phase is then dried over calcium sulfate, concentrated and distilled. 3-hexen-1-yl-3-hexenoate is collected as the fraction boiling at 115° C. (8 mm.).

For a fuller understanding of the nature and objects of this invention, reference may be had to the following example which is given merely as a further illustration of the invention and is not to be construed in a limiting sense.

*Example*

To a well stirred mixture of 150.0 grams of 3-hexen-1-ol, 300 cc. of benzene, 112 cc. of acetic acid, 1500 cc. of water and 375.0 grams of sodium dichromate dihydrate, there was added 900.0 grams of a 33% solution of concentrated (98%) sulfuric acid. Addition of sulfuric acid was carried out gradually, with stirring, over a period of about ninety minutes. The temperature of the reaction mixture was maintained, by external cooling, within the range of from 30° C. to about 35° C. during the addition of the acid. The reaction mixture was stirred at a temperature of from about 30° C. to about 35° C. for an additional five hours after all of the sulfuric acid had been added. Thereafter, the reaction mixture was allowed to stand overnight at room temperature.

Subsequently, the aqueous layer was separated from the benzene layer. The aqueous layer was then extracted two times with fresh benzene. The benzene extracts were combined with the benzene phase of the reaction mixture and the combined benzene solution was washed until neutral, first with sodium bicarbonate and thereafter with aqueous sodium chloride. The solution was then dried with calcium sulfate, concentrated and distilled. 3-hexen-1-yl-3-hexenoate was collected as a fraction boiling at 115° C. (8 mm.); $n_D^{25}$ 1.4479; $d_{25}$ 0.9000.

We claim:

3-hexen-1-yl-3-hexenoate having the formula:

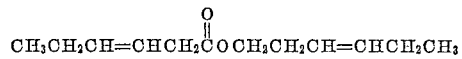

References Cited in the file of this patent

Organic Syntheses Collective, vol. I, pages 138–140 (Robertson), published 1941, John Wiley & Sons.